Figure 1:
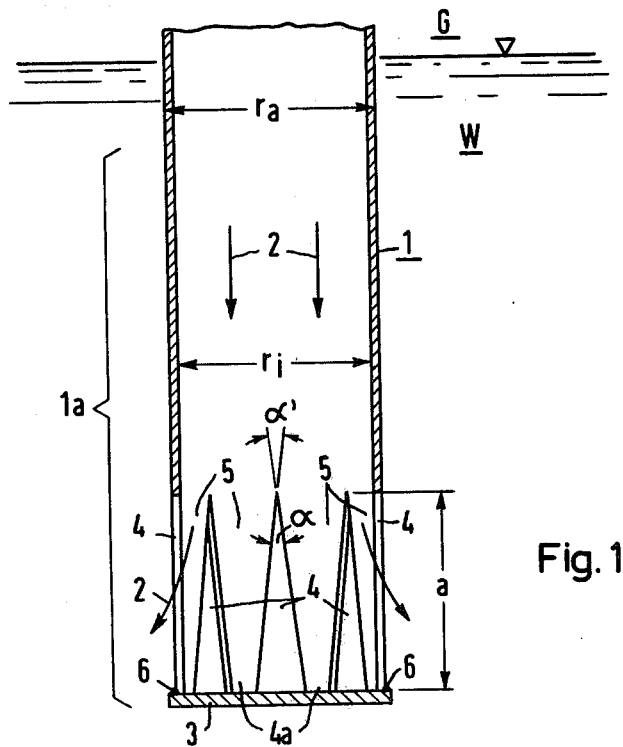

United States Patent [19]

Simon et al.

[11] 4,172,009
[45] Oct. 23, 1979

[54] CONDENSATION TUBE FOR A BLOW-OFF DEVICE FOR LIMITING EXCESS PRESSURE IN NUCLEAR POWER PLANTS, ESPECIALLY IN BOILING WATER NUCLEAR POWER PLANTS

[75] Inventors: Ulrich Simon, Frankfurt; Klaus-Dieter Werner, Langen; Bernd Pontani, Alzenau, all of Fed. Rep. of Germany

[73] Assignee: Kraftwerk Union Aktiengesellschaft, Mülheim, Fed. Rep. of Germany

[21] Appl. No.: 787,323

[22] Filed: Apr. 14, 1977

[30] Foreign Application Priority Data

Apr. 15, 1976 [DE] Fed. Rep. of Germany ....... 2616830

[51] Int. Cl.² .............................................. G21C 9/00
[52] U.S. Cl. ...................................... 176/38; 176/87; 261/123
[58] Field of Search ............................ 176/37, 38, 87; 261/121 R, 122, 123, 124, DIG. 10, DIG. 76

[56] References Cited

U.S. PATENT DOCUMENTS

| 850,680 | 4/1907 | Smith ................................... 261/124 |
| 969,906 | 9/1910 | Roelofsen ........................ 261/121 R |
| 1,051,957 | 2/1913 | Jacobs et al. ........................... 261/124 |
| 1,641,394 | 9/1927 | Martin .................................. 261/123 |
| 1,740,441 | 12/1929 | Chogo ............................... 261/121 R |
| 2,863,653 | 12/1958 | Cummings ........................... 261/122 |
| 4,022,655 | 5/1977 | Gaouditz et al. ...................... 176/65 |

FOREIGN PATENT DOCUMENTS 161718  6/1903  Fed. Rep. of Germany ...... 261/122 R

Primary Examiner—Samuel W. Engle
Assistant Examiner—Ralph Palo
Attorney, Agent, or Firm—Herbert L. Lerner

[57] ABSTRACT

In a blow-off device for limiting excess pressure in nuclear power plants, a condensation tube disposed so that a lower outlet end thereof is immersed in a volume of water in a condensation chamber having a gas cushion located in a space above the volume of water, and an upper inlet end of the condensation tube extends out of the volume of water and is connectible to a source of steam that is to be condensed or a steam-air mixture, the outlet end of the condensation tube being further provided with a base member at the mouth of the outlet end for limiting steam flows discharging in axial direction of the tube, and being formed with lateral openings subdividing the steam flow and bubbles produced in the volume of water, the lateral outlet openings being formed of slots widening toward the end of the condensation tube, the slots being distributed over the periphery of the outlet end of the condensation tube.

7 Claims, 2 Drawing Figures

CONDENSATION TUBE FOR A BLOW-OFF DEVICE FOR LIMITING EXCESS PRESSURE IN NUCLEAR POWER PLANTS, ESPECIALLY IN BOILING WATER NUCLEAR POWER PLANTS

The invention relates to a condensation tube for blow-off devices for limiting excess pressure in nuclear power plants, especially in boiling water-nuclear power plants, and more particularly wherein the condensation tube is disposed so that a lower outflow or outlet end thereof is immersed in a volume of water in a condensation chamber or water receiver having a gas cushion located in a space above the volume of water, and an upper inflow or inlet end of the condensation tube extends out of the volume of water and is connected to a source of steam that is to be condensed or a steam-air mixture, the outflow end of the condensation tube, for stabilizing the condensation, being provided with a base member at the mouth of the condensation tube for limiting the steam flows discharging in axial direction of the tube, and being formed with lateral outlet openings subdividing the steam flow and bubbles produced in the volume of water.

Such a condensation tube has become known heretofore from German Published Prosecuted Application DT-AS 2 212 761. It has particular importance for the so-called pressure reduction system, which condenses the discharging steam and thereby depressurizes or relieves the safety vessel in the event of an accident. In this system, the reactor pressure vessel and the coolant circulatory loops are disposed in a relatively small pressure chamber formed of steel or prestressed concrete, which is pressure-proof and technically gas-tight. The condensation tubes extend out of this pressure chamber into a condensation chamber and are immersed in a water basin (water receiver) that is always filled therein. The pressure chamber and the condensation chamber are enclosed by the safety vessel. The pressure reduction system is located in a reactor building which is always maintained at a slightly negative pressure. If steam is set free because of a possible break in an equipment component in the pressure chamber, the pressure chamber thus cushions or blocks the pressure shock; the water vapor or steam flows into the condensation chamber and is condensed therein. The pressure reduction system has, however, not only the function of the condensation of the steam during coolant loss trouble, but also serves as auxiliary condenser during given reactor transients. That which is especially involved therewith is the blow-off of steam from blow-off lines of the pressure relief and safety valve, and the exhaust steam of the emergency condensation and emergency feed turbines.

It is of importance for the condensation process that a very broad spectrum of possible steam flow densities is provided. Thus, in the case of blow-off of the relief valves in the respective condensation tubes, high steam flow densities exist, the same being true at the start of coolant loss trouble. In the exhaust steamlines and the respective condensation tubes of the emergency condensation and the emergency feed turbines as well in the course of a coolant loss occurrence, the steam flow densities are, by contrast, very low. Even lower steam flow densities can occur also in the condensation tubes connected to the blow-off lines of the depressurizing or relief valves and, in fact, when a relief valve springs a leak, and a lingering or creeping steam flow sets in. The incident steam flow densities drop from about 1,000 kg/m$^2$sec during blow-off of the relief valves down to 2 to 10 kg/m$^2$sec during the creeping steam flow.

It is accordingly an object of the invention to provide a condensation tube for a blow-off device for limiting excess pressure in nuclear power plants, especially in boiling water nuclear power plants, that are of such improved construction that a stabilized condensation is assured over the entire spectrum of the steam flows. Furthermore, it is an object to provide such a condensation tube that can be produced rather simply at relatively low cost for manufacturing technology.

With the foregoing and other objects in view, there is provided, in accordance with the invention, in a blow-off device for limiting excess pressure in nuclear power plants, especially in boiling-water nuclear power plants, a condensation tube disposed so that a lower outlet end thereof is immersed in a volume of water in a condensation chamber having a gas cushion located in a space above the volume of water, and an upper inlet end of the condensation tube extends out of the volume of water and is connectible to a source of steam that is to be condensed or a steam-air mixture, the outlet end of the condensation tube being further provided with a base member at the mouth of the outlet end for limiting steam flow discharging in axial direction of the tube, and being formed with lateral outlet openings subdividing the steam flow and bubbles produced in the volume of water, the lateral outlet openings being formed of slots widening toward the end of the condensation tube, the slots being distributed over the periphery of the outlet end of the condensation tube. The advantages attainable with the invention are primarily that such slots are relatively simple to produce in the mouth region of a condensation tube, for example, by a severing or parting operation, the cross-pieces remaining between adjacent slots serving simultaneously with the end surfaces thereof as attachment projections for the base member at the tube mouth. The slots serve with the narrower zone thereof especially for blowing-off smaller steam flows; if the steam flow increases, then wider slot zones for blowing-off are automatically called upon, in each case the distribution or division of the partial steam flows and the condensation bubbles being retained.

In accordance with another feature of the invention, the slots, respectively, have the shape of an acute triangle, so that the geometry of the tube mouth is constructed like a type of notched or serrated crown. Production thereof is thereby especially simple.

In accordance with a further feature of the invention, the respective slots have a length that is 0.8 to 1.5 times the inner diameter of the condensation tube, and the triangular slots, respectively, have an apex defining an aperture angle of between 10° to 15°.

In accordance with an additional feature of the invention, respective tube tongues remain between adjacent slots, the tongues having free ends abutting the base member at the tube mouth and being secured thereto by weldment.

In accordance with an added feature of the invention, respective mutually adjacent slots are spaced from one another in vicinity of the triangle base thereof by the width of the end of the respective tongues which is at least one-fourth, preferably from about ½ to 1 length of the triangle base.

In accordance with yet another feature of the invention, for condensation of small mass flow densities, the base member at the tube mouth is in the form of an insert member having a substantially conical contour, the insert member having an apex extending into the outlet end of the condensation tube, the insert member axially overlapping the slots.

In accordance with yet a further feature of the invention, the substantially conical insert member has a height between the base and apex thereof that is at least ¼, and preferably ½ to 1/1 the height of the respective slots. Through this shape of the base member, return flow of the water is effectively diminished for low mass flow densities.

In accordance with a concomitant feature of the invention, the insert member has lateral casing surfaces formed as inwardly curved flow guidance surfaces.

Other features which are considered as characteristic for the invention are set forth in the appended claims.

Although the invention is illustrated and described herein as embodied in a condensation tube for a blow-off device for limiting excess pressure in nuclear power plants, especially in boiling water nuclear power plants, it is nevertheless not intended to be limited to the details shown, since various modifications and structural changes may be made therein without departing from the spirit of the invention and within the scope and range of equivalents of the claims.

Figure 2:
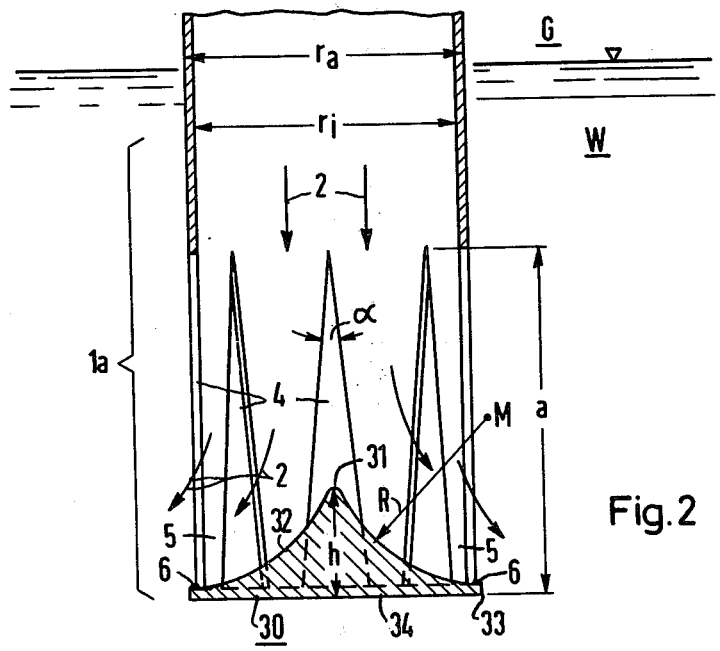

The construction and method of operation of the invention, however, together with additional objects and advantages thereof will be best understood from the following description of specific embodiments when read in connection with the accompanying drawings, in which:

FIG. 1 is a diagrammatic longitudinal sectional view of the end of a condensation tube that is used for blow-off devices of the hereinaforementioned type and which is provided with a flat base member at the mouth thereof; and FIG. 2 is a somewhat enlarged view corresponding to that of FIG. 1 of another embodiment of the invention wherein the base member at the mouth of the condensation tube end is a conical insert member.

Referring now to the drawing and first, particularly, to FIG. 1 thereof, there is shown a condensation tube 1 having an outlet or outflow end 1a with which it is immersed in a water receiver or condensation chamber W. A gas or air cushion G is located above the water receiver W. To stabilize the condensation, steam or a steam-air mixture is blown off into the water of the water receiver W through lateral outlet openings 4 defined in part by a base member 3 located at the mouth of the condensation tube 1 for limiting the discharging flows of steam in axial direction of the tube, the lateral outlet openings 4 subdividing the steam flow and the bubbles produced in the volume of water W. In accordance with the invention, the outlet openings 4 are formed as slots widening toward the end 1a of the condensation tube 1 and distributed in mutually spaced relationship over the periphery of the outlet or outflow end 1a of the tube 1. In the illustrated embodiment, the slots 4 have the shape of an acute triangle, eight triangular slots 4 being uniformly distributed over the periphery of the outlet or outflow end or tube mouth 1a. The slots 4 have an axial length a that is substantially 0.8 to 1.5 times the inner diameter $d_i$ of the tube 1, and the vertex angle of the triangle constitutes an aperture angle $\alpha = 11°$. This is elucidated by the diagrammatically illustrated apex angle $\alpha^1$. A preferred range of values for the aperture angle $\alpha$ lies between 10° and 15°. Trapezoidal tube tongues 5 remain between the triangular slots 4, the ends of the tongues 5 at the base member 3 of the tube mouth being welded thereto. The mutual spacing of adjacent slots 4 in vicinity of the bases 4a of the triangular slots 4 or, in other words, the width of the tube tongue ends 5 is equal to at least ¼ the length of the base 4a of a triangular slot 4, and preferably to about ½ to 1 length of the slot base 4a. The base member 3 at the tube mouth and the ends of the tube tongues are mutually secured by a welding seam 6.

FIG. 2 shows an especially advantageous embodiment of the invention for blowing off small mass-flows and that is provided at the tube mouth thereof with a base member formed as a conical insert 30 having a cone apex 31 extending inwardly into the interior of the outlet or outflow end 1a of the condensation tube 1. The cone apex 31 is rounded off, and the cone casing surface 32 is inwardly curved (radius of curvature R with a center of curvature M). The attachment of the cone insert 30 corresponds to that of the base member 3 at the tube mouth, the cone insert 30 i.e., the overlapping marginal edge 33 of the disc-shaped foot portion 34 thereof, is welded to the ends of the tongues 5 by the welding seams 6. In other respects, the construction of the embodiment of FIG. 2 corresponds to that of the embodiment of FIG. 1, like parts in both embodiments bearing the same reference numerals in both figures. The cooperation of the slots 4 with the flow guidance surfaces at the cone apex 31 and at the lateral cone surface 32 produces an especially advantageous blow-off characteristic supported or assisted by diffurser action even for small mass flow densities, in a manner that, thereby, return flow of the water during the condensation process is effectively diminshed. This diffuser action is produced especially for a cone height h that is at least ¼, but preferably ½ to 1/1 of the slot height a as viewed in FIG. 2, and with the illustrated concave outline of the cone surface 32.

Also within the scope of the invention of the instant application is an embodiment wherein, deviating from the illustrated embodiments, $d_i < d_a$ (one-piece condensation tube 1), the mouth end 1a of the condensation tube 1 being constructed as a separate tube section with an inner diameter corresponding to the outer diameter $d_a$ of the condensation tube 1, so that this separate tube section is slideable onto the condensation tube 1 and firmly weldable thereto. Furthermore, the base member 3 at the tube mouth can be perforated with bores so that partial steam flows can also discharge in axial direction in finely divided form.

There are claimed:

1. In a blow-off device for limiting excess pressure in nuclear power plants, a condensation tube for condensation of small mass flow densities disposed so that a lower outlet end thereof is immersed in a volume of water in a condensation chamber having a gas cushion located in a space above the volume of water, and an upper inlet end of the condensation tube extends out of the volume of water and is connectible to a source of steam that is to be condensed or a steam-air mixture, the outlet end of the condensation tube being further provided with a base member at the mouth of the outlet end for limiting steam flows discharging in axial direction of the tube, and being formed with lateral outlet openings subdividing the steam flow and bubbles produced in the volume of water, the lateral outlet openings being formed of slots widening toward the end of the condensation tube and, respectively, having the shape of an acute triangle, said slots being distributed over the periphery of the outlet end of the condensation tube, said base member being in the form of an insert member having a substantially conical contour with inwardly curved flow guidance surfaces, said insert member having an apex extending into the outlet end of the condensation tube, said insert member axially overlapping said slots.

2. Condensation tube according to claim 1 wherein the respective slots have a length that is 0.8 to 1.5 times the inner diameter of the condensation tube, and said triangular slots, respectively, have an apex defining an aperture angle of between 10° to 15°.

3. Condensation tube according to claim 1 wherein said slots, respectively, have the shape of an acute triangle, and wherein respective tube tongues remain between adjacent slots, said tongues having free ends abutting the base member at the tube mouth and being secured thereto by weldment.

4. Condensation tube according to claim 3 wherein respective mutually adjacent slots are spaced from one another in vicinity of the triangle base thereof by the width of the end of the respective tongues which is at least one-fourth the length of the triangle base.

5. Condensation tube according to claim 4 wherein the spacing between the slots at the base of the triangle-shape thereof, constitutes the width of the respective end of the tube tongue and is from about ½ to 1 length of said triangle base.

6. Condensation tube according to claim 1 wherein said substantially conical insert member has a height between the base and apex thereof that is at least ¼ the height of the respective slots.

7. Condensation tube according to claim 6 wherein said height of said insert member is from ½ to 1/1 the height of the respective slots.

* * * * *